United States Patent [19]

O'Dell

[11] 4,019,354
[45] Apr. 26, 1977

[54] MOTORCYCLE CHAIN LOCK

[75] Inventor: Marvin O'Dell, Fort Lauderdale, Fla.

[73] Assignee: The Raymond Lee Organization, Inc., a part interest

[22] Filed: Feb. 9, 1976

[21] Appl. No.: 656,370

[52] U.S. Cl. .................................. 70/236; 70/18; 70/38 A

[51] Int. Cl.² ...................... B62H 5/06; B62H 5/12

[58] Field of Search ........ 70/236, 233, 38 R, 38 A, 70/39, 18

[56] References Cited

UNITED STATES PATENTS

| 60,454 | 12/1866 | Wootten | 70/18 X |
|---|---|---|---|
| 587,456 | 8/1877 | Scott | 70/236 |
| 3,754,420 | 8/1973 | Oellerich | 70/18 X |

FOREIGN PATENTS OR APPLICATIONS

| 3,578 | 1894 | United Kingdom | 70/236 |

Primary Examiner—J. Franklin Foss

[57] ABSTRACT

A lock adapted to engage links of a chain of a motorcycle or the like to prevent theft. A main body has at one end a plate detachably secured thereto, said plate having an open position at which it is detached from said body and having a closed position at which it is secured to said one end of said body. The body and the plate, when the plate is in closed position, cooperate to define the boundary surfaces of a chain receiving channel open at both ends which extends along said one end of the body and said plate. Each of first and second spaced apart parallel prongs is secured at one end to the plate and extends at right angles thereto, the opposite ends of said prongs being enlarged and constituting prong heads. The prongs pass transversely through spaces in said chain when said chain is in the channel with the heads disposed between the chain and said one end of the body. A manually operable lock mechanism is disposed in the body, said mechanism including a rotatable cylinder with an offset locking arm. The cylinder, when the mechanism is locked and the plate is in closed position, assumes a first position of rotation at which said arm engages said heads to lock the chain in place. The cylinder, when the mechanism is unlocked, assumes a second position of rotation at which said arm is spaced from the heads whereby the plate can be placed in open position and said chain removed.

3 Claims, 5 Drawing Figures

MOTORCYCLE CHAIN LOCK

SUMMARY OF THE INVENTION

This invention is directed toward a lock which is adapted to engage links of a chain such as a motorcycle chain to prevent rotation of the chain and thus prevent theft.

To this end, a main body has at one end a plate detachably secured thereto. The plate has an open position at which it is detached from said body and has a closed position at which it is secured to one of said body. The body and plate, when the plate is in closed position, cooperate to define the boundary surface of a chain receiving channel open at both ends which extends along said one end of the body and said plate.

Each of first and second spaced apart parallel prongs is secured at one end to the plate and extends at right angles thereto. The opposite ends of said prongs are enlarged and constitute prong heads, said prongs passing transversely through spaces in said chain when said chain is in the channel with the heads disposed between the chain and said one end of the body.

A lock mechanism is disposed in the body, said mechanism including a rotatable cylinder with an offset locking arm. The cylinder, when the mechanism is locked and the plate is in closed position, assumes a first position of rotation at which said arm engages said heads to lock the chain in place. The cylinder, when the mechanism is unlocked, assumes a second position of rotation at which said arm is spaced from the heads whereby the plate can be placed in open position and said chain removed.

When the invention is secured to the links of a chain in this manner, the chain cannot rotate appreciably whereby the cycle can not be driven off by a thief. Instead, the thief must carry the cycle. This is normally too difficult and consequently, protection against theft is obtained.

DETAILED DESCRIPTION OF PREFERRED EMBODIMENTS

Figures 1, 2:
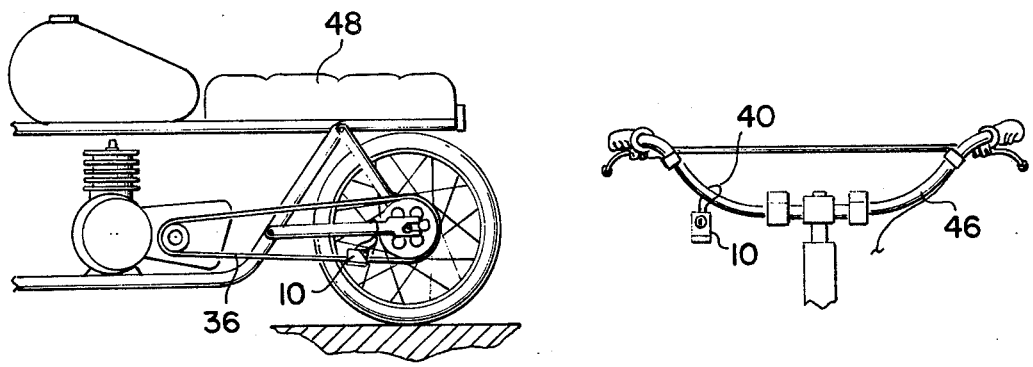
FIG. 1 shows the invention in use.
FIG. 2 is a detail view showing the invention when not in use.
Figures 3, 5:
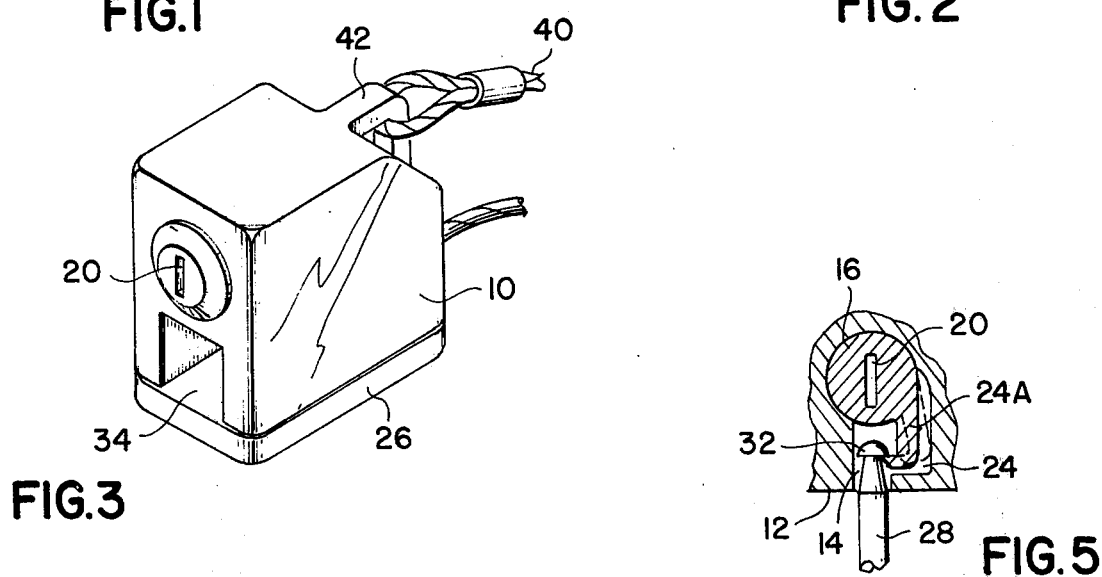
FIG. 3 is a perspective detail view of the invention.
FIG. 5 is a view taken along line 5—5 in FIG. 4.
Figure 4:
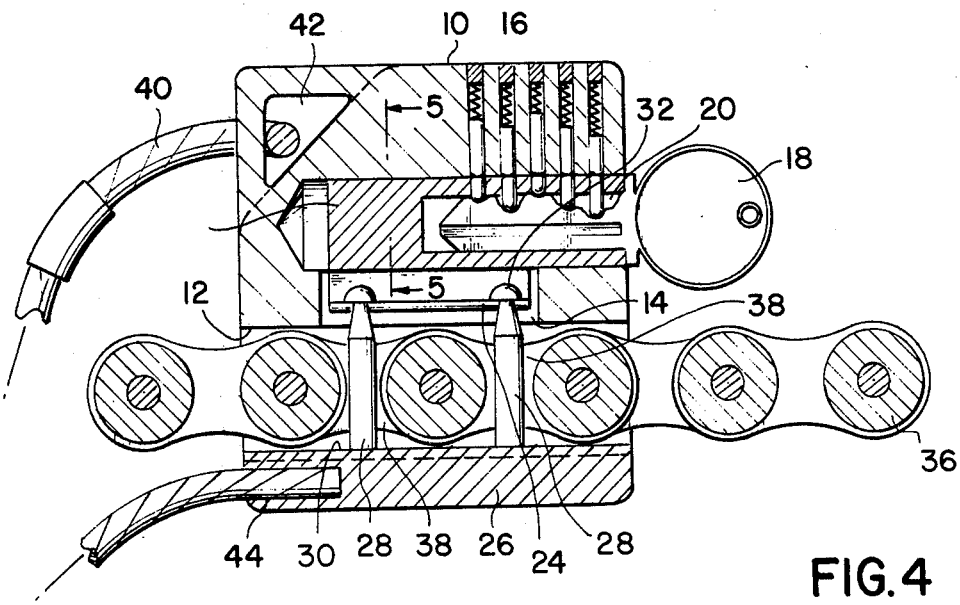
FIG. 4 is an enlarged cross-sectional view of the invention in use.

Referring now to FIGS. 1-5, a main body 10 has one end with a transversely extending relatively large groove of square shaped cross section. An inner boundary surface 12 of this groove has a recess 14. This recess is disposed adjacent a rotatable key operated cylinder 16 which is rotated either to locked position or unlocked position by a key 18 after the key has been inserted into the key slot 20 and turned. Conventional tumblers 22 can be used as shown. The cylinder 16 has an offset arm 24 which has a first position when the cylinder is rotated into locking position as shown in solid line in FIG. 5 and FIG. 4 and has a second position when the cylinder is rotated into unlocked position as shown in dotted line at 24A in FIG. 5.

A bottom plate 26 has two parallel prongs 28 each of which is secured to the inner surface 30 of plate 28. These prongs are disposed at right angles to surface 30 and have opposite enlarged ends forming heads 32.

When the prongs extend into the large groove, with heads 32 extending into the recess 14, the arm 24 will engage both heads when the cylinder is in locked position and hold the heads in place. The plate is then locked to the body. Under this condition the large groove and surface 30 together define a chain receiving channel 34.

When chain 36 has been disposed in the channel with the prongs extending through links 38, the chain cannot move appreciably.

A flexible length of cable 40 or the like is secured at one end to an enlarged eye 42 on the main body and is secured at the other end to the plate, the other end being clamped in a bore 44 in the plate. This cable can be made with a buckle or other detachably engagable means intermediate its ends.

The lock can be secured detachably to handle bars 46 or the like of a cycle 48 when the lock is not in use.

The groove can be shaped to conform with the shape of a chain and thus need not have the square shaped cross section shown.

Cable 40 can also be considered to be an additional safeguard feature of the lock intended to be wrapped around a structurally sound part of the cycle such as the frame or wheel spokes to act as additional means for preventing appreciable movement of the chain.

While the invention has been described with particular reference to the drawings, the protection sought is to be limited only by the terms of the claims which follow.

What is claimed is:
1. A lock designed to engage links of a chain, comprising:
   a main body with a transversely extending groove having a square cross-section, open ends and an open bottom;
   a flat rectangular plate detachably securable to the bottom of the body to close off the open bottom of the groove to form a chain receiving channel when the plate is in a closed position attached to the body and to be detached from the body in an open position when the plate is not attached to the body;
   first and second like, parallel prongs spaced apart from each other and attached to the plate at their lower ends and extending perpendicularly upwardly away from the plate, the tops of the prongs being enlarged and constituting prong heads, the prongs being so located as to pass transversely through spaces in the chain when the chain is located in the channel and the plate is in a closed position;
   a key-operated tumbler cylinder rotatably secured in the body so as to be rotatable between an open position and a closed position; and
   an offset locking arm fixedly secured to the cylinder in a manner that the arm will engage the heads of the prongs to secure the plate to the body when the cylinder is rotated to a closed position and the plate is in a closed position and that the arm will be disengaged from the heads of the prongs when the cylinder is rotated to an open position and the plate is in a closed position.

2. The lock of claim 1 wherein a loop of cable is secured at one end to the main body and at the other end to the plate.

3. The lock of claim 2 wherein said one end of the body has a recess into which said heads extend when the mechanism is locked.

* * * * *